United States Patent
Bian et al.

(10) Patent No.: US 12,135,456 B2
(45) Date of Patent: Nov. 5, 2024

(54) WAVEGUIDE CORES WITH A DUAL-TRAPEZOIDAL SHAPE

(71) Applicant: GlobalFoundries U.S. Inc., Malta, NY (US)

(72) Inventors: Yusheng Bian, Ballston Lake, NY (US); Koushik Ramachandran, Wappingers Falls, NY (US); Karen Nummy, Newburgh, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 229 days.

(21) Appl. No.: 17/850,128

(22) Filed: Jun. 27, 2022

(65) Prior Publication Data
US 2023/0417991 A1 Dec. 28, 2023

(51) Int. Cl.
*G02B 6/122* (2006.01)
*G02B 6/136* (2006.01)
*G02B 6/14* (2006.01)
*G02B 6/30* (2006.01)
*G02B 6/12* (2006.01)

(52) U.S. Cl.
CPC ........... *G02B 6/1228* (2013.01); *G02B 6/136* (2013.01); *G02B 6/14* (2013.01); *G02B 6/305* (2013.01); *G02B 2006/12121* (2013.01); *G02B 2006/12123* (2013.01); *G02B 2006/12152* (2013.01)

(58) Field of Classification Search
CPC ....... G02B 6/1228; G02B 6/136; G02B 6/305
See application file for complete search history.

(56) References Cited

U.S. PATENT DOCUMENTS

| | | | | |
|---|---|---|---|---|
| 9,158,070 | B2* | 10/2015 | Farmer | .................... G02B 6/14 |
| 10,955,615 | B2 | 3/2021 | Picard et al. | |
| 11,215,756 | B2 | 1/2022 | Bian et al. | |
| 2018/0321445 | A1* | 11/2018 | Piazza | .................... G02B 6/305 |
| 2019/0271897 | A1* | 9/2019 | Iwatsuka | ................ G02B 6/126 |
| 2022/0043207 | A1 | 2/2022 | Bian | |
| 2022/0326554 | A1* | 10/2022 | Take | ....................... G02F 1/225 |

FOREIGN PATENT DOCUMENTS

WO WO-2004008203 A1 * 1/2004 ........... G02B 6/1228

OTHER PUBLICATIONS

Bian, Yusheng et al. "Confining Features for Mode Shaping of Lasers and Coupling With Silicon Photonic Components" filed Feb. 4, 2021 as a U.S. Appl. No. 17/167,201.

G. Roelkens, D. Van Thourhout, R. Baets, R. Notzel, and M. Smit, "Laser emission and photodetection in an InP/InGaAsP layer integrated on and coupled to a Silicon-on-Insulator waveguide circuit," Opt. Express 14, 8154-8159 (2006).

(Continued)

*Primary Examiner* — Daniel Petkovsek
(74) *Attorney, Agent, or Firm* — Thompson Hine LLP; Anthony Canale

(57) ABSTRACT

Structures for a waveguide core and methods of fabricating such structures. The structure comprises a waveguide core including a section having a first trapezoidal portion and a second trapezoidal portion stacked with the first trapezoidal portion. The first trapezoidal portion has a first trapezoidal shape, and the second trapezoidal portion has a second trapezoidal shape different from the first trapezoidal shape.

20 Claims, 6 Drawing Sheets

(56) References Cited

OTHER PUBLICATIONS

Zhongfa Liao, S. J. Wagner, M. Z. Alam, V. Tolstikhin, and J. Stewart Aitchison, "Vertically integrated spot-size converter in AlGaAs-GaAs," Opt. Lett. 42, 4167-4170 (2017).

Tu, Yi-Chou et al., "High-Efficiency Ultra-Broadband Multi-Tip Edge Couplers for Integration of Distributed Feedback Laser With Silicon-on-Insulator Waveguide," in IEEE Photonics Journal, vol. 11, No. 4, pp. 1-13, Aug. 2019, Art No. 6602113, doi: 10.1109/JPHOT.2019.2924477 (Aug. 2019).

N. Hatori et al., "A Hybrid Integrated Light Source on a Silicon Platform Using a Trident Spot-Size Converter," in Journal of Lightwave Technology, vol. 32, No. 7, pp. 1329-1336, doi: 10.1109/JLT.2014.2304305 (Apr. 1, 2014).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Bian, Yusheng et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Bian, Yusheng et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

Bian, Yusheng et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Bian, Yusheng et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th3l.4 (2020).

Bian, Yusheng et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Bian, Yusheng "Edge Couplers With Metamaterial Rib Features" filed Jul. 7, 2021 as a U.S. Appl. No. 17/369,253.

Bian, Yusheng "Edge Couplers With Confining Features" filed Oct. 4, 2021 as a U.S. Appl. No. 17/493,260.

\* cited by examiner

WAVEGUIDE CORES WITH A DUAL-TRAPEZOIDAL SHAPE

BACKGROUND

The disclosure relates to photonics chips and, more specifically, to structures including a waveguide core and methods of fabricating such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Improved structures including a waveguide core and methods of fabricating such structures are needed.

SUMMARY

In an embodiment of the invention, a structure comprises a waveguide core including a section having a first trapezoidal portion and a second trapezoidal portion stacked with the first trapezoidal portion. The first trapezoidal portion has a first trapezoidal shape, and the second trapezoidal portion has a second trapezoidal shape different from the first trapezoidal shape.

In an embodiment of the invention, a method comprises forming a waveguide core including a section having a first trapezoidal portion and a second trapezoidal portion stacked with the first trapezoidal portion. The first trapezoidal portion has a first trapezoidal shape, and the second trapezoidal portion has a second trapezoidal shape different from the first trapezoidal shape.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
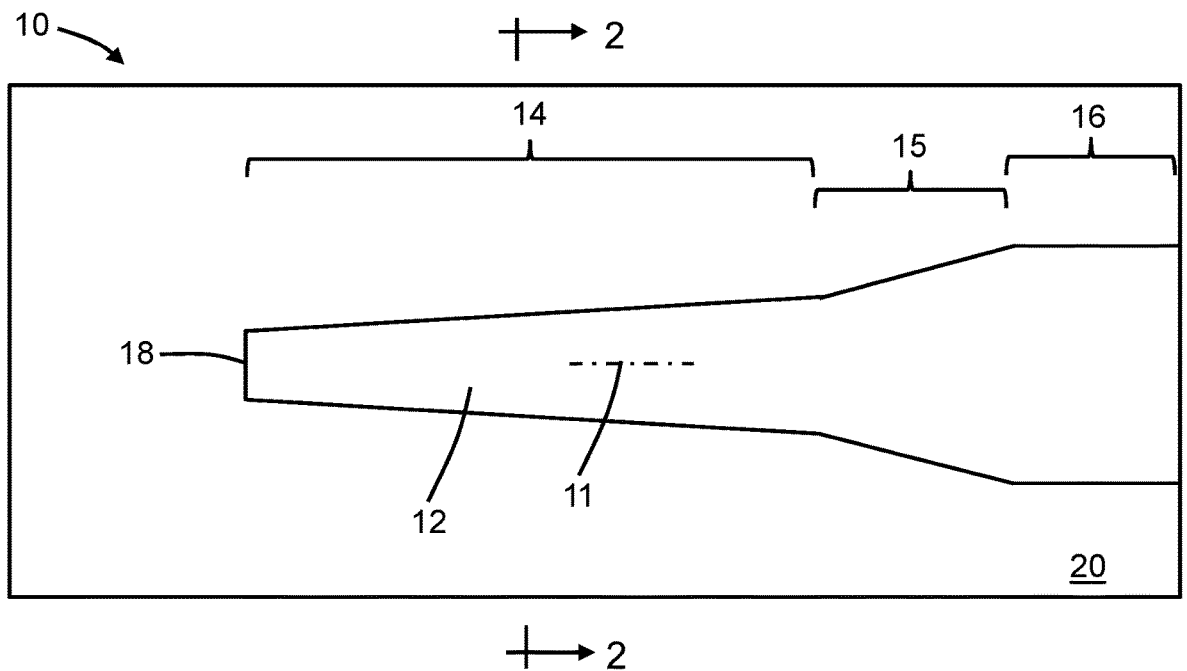
FIG. 1 is a top view of a structure at an initial fabrication stage of a processing method in accordance with embodiments of the invention.
Figure 2:
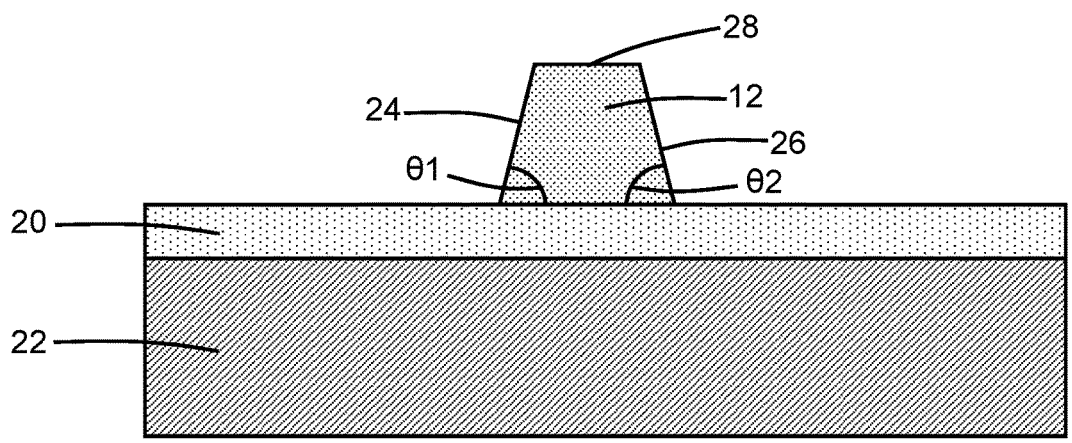
FIG. 2 is a cross-sectional view taken generally along line 2-2 in FIG. 1.

With reference to FIGS. 1, 2 and in accordance with embodiments of the invention, a structure 10 for an edge coupler includes a waveguide core 12 with a tapered section 14, a section 16, and a tapered section 15 that joins the section 16 to the tapered section 14. The tapered section 14 of the waveguide core 12 terminates at an end 18, and the section 16, which may be non-tapered, is coupled with optical components on a photonics chip. The tapered sections 14, 15 and the section 16 are aligned along a longitudinal axis 11. The tapered sections 14, 15 may define respective inverse tapers having widths that increase with increasing distance from the terminating end 18. An inverse taper refers to a tapered section of a waveguide core characterized by a gradual increase in width along a mode propagation direction. In an embodiment, the width of the tapered sections 14, 15 may increase linearly. In an alternative embodiment, the width of the tapered sections 14, 15 may increase based on a non-linear function, such as a quadratic function, a cubic function, a parabolic function, a sine function, a cosine function, a Bezier function, or an exponential function. In an embodiment, the tapered sections 14, 15 may include a single stage of tapering with a single taper angle.

The waveguide core 12 may be positioned in a vertical direction over a dielectric layer 20 and a substrate 22. In an embodiment, the dielectric layer 20 may be comprised of a dielectric material, such as silicon dioxide, and the substrate 22 may be comprised of a semiconductor material, such as single-crystal silicon. In an embodiment, the dielectric layer 20 may be a buried oxide layer of a silicon-on-insulator substrate, and the dielectric layer 20 may separate the waveguide core 12 from the substrate 22. In an alternative embodiment, an additional dielectric layer comprised of, for example, silicon dioxide may separate the waveguide core 12 from the dielectric layer 20.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon. In an alternative embodiment, the waveguide core 12 may be comprised of a dielectric material, such as silicon nitride. In an alternative embodiment, the waveguide core 12 may be comprised of silicon oxynitride. In alternative embodiments, other materials, such as a polymer or a III-V compound semiconductor, may be used to form the waveguide core 12.

In an embodiment, the waveguide core 12 may be formed by patterning a layer of material with lithography and etching processes. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer of a material (e.g., silicon nitride).

The tapered sections 14, 15 of the waveguide core 12 have a sidewall 24, a sidewall 26 opposite from the sidewall 24, and a top surface 28. The sidewalls 24, 26 both extend longitudinally to the terminating end 18 and project in a vertical direction from the dielectric layer 20 to the top surface 28. The sidewalls 24, 26 are angled relative to a vertical direction and inwardly converge toward the top surface 28 such that the width decreases with decreasing distance from the top surface 28. The sidewalls 24, 26 define respective upper corners at their intersection with the top surface 28. In an embodiment, the top surface 28 may be parallel to a bottom surface positioned on the dielectric layer 20 and connected to the top surface 28 by the sidewalls 24, 26.

In a direction parallel to the longitudinal axis 11, the tapered sections 14, 15 of the waveguide core 12 have a trapezoidal shape due to the convergent inclination of the sidewalls 24, 26 toward the top surface 28. The trapezoidal shape of the tapered sections 14, 15 of the waveguide core 12 may be characterized by a pair of base angles $\theta 1$, $\theta 2$ adjacent to the dielectric layer 20. In an embodiment, each of the of base angles $\theta 1$, $\theta 2$ may be an acute angle. In an embodiment, the trapezoidal shape of the tapered sections 14, 15 of the waveguide core 12 may be an isosceles trapezoid characterized by base angles $\theta 1$, $\theta 2$ that are equal. In an alternative embodiment, the base angles $\theta 1$, $\theta 2$ may be unequal and different.

In an alternative embodiment, a layer may be connected to a lower portion of the sidewalls 24, 26. The layer may be formed when the waveguide core 12 is patterned, and the layer, which is positioned on the dielectric layer 20, has a thickness that is less than the thickness of the waveguide core 12.

Figure 3:
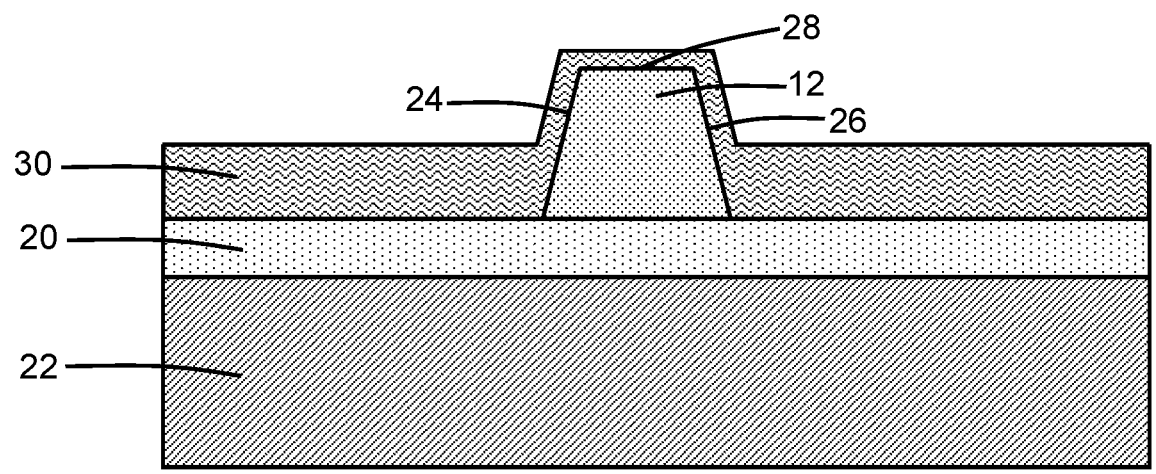
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage, a resist layer 30 is formed over the tapered sections 14, 15 of the waveguide core 12 and dielectric layer 20. The resist mask may include multiple layers of a photoresist applied by a spin-coating process, pre-baked, exposed to light projected through a photomask, baked after exposure, and developed with a chemical developer. The resist layer 30 may be thinner on the upper portion of the tapered sections 14, 15 of the waveguide core 12 than on the dielectric layer 20. The thin portion of the resist layer 30 may be provided by introducing a different mask level separate from the mask level producing the thick portion.

Figure 4:
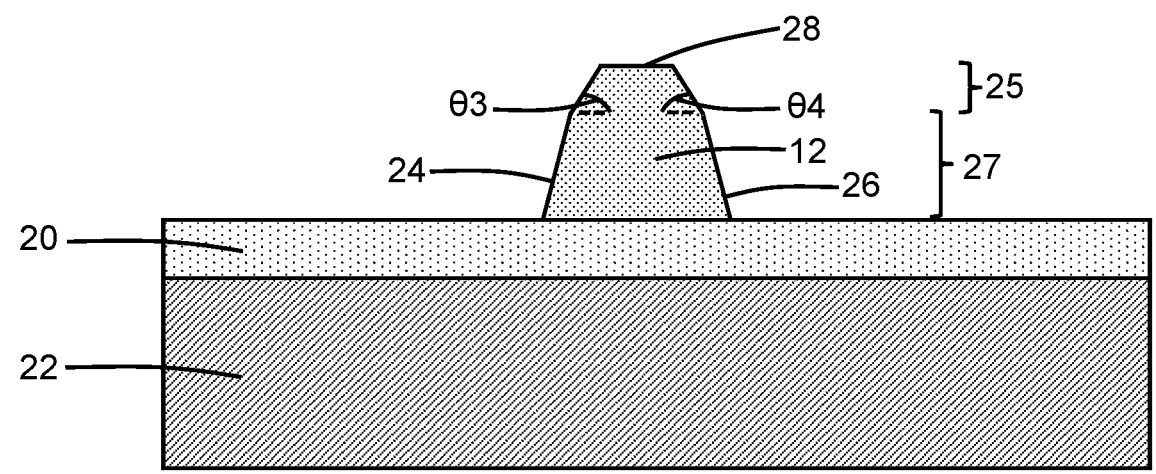
FIG. 4 is a cross-sectional view of the structure at a fabrication stage of the processing method subsequent to FIG. 3.

With reference to FIG. 4 in which like reference numerals refer to like features in FIG. 3 and at a subsequent fabrication stage, the upper corners of the tapered sections 14, 15 of the waveguide core 12 at the intersections of the sidewalls 24, 26 with the top surface 28 are etched and reshaped using an isotropic etching process, and the resist layer 30 is subsequently stripped. In an embodiment, the isotropic etching process may be a reactive ion etching process. The isotropic etching process removes the thin portions of the resist layer 30 at the upper corners of the tapered sections 14, 15 of the waveguide core 12 and then etches the upper corners of the tapered sections 14, 15 of the waveguide core 12 in an oblique manner such that the upper corners of the waveguide core 12 are chamfered.

An upper portion 25 of the tapered sections 14, 15 of the waveguide core 12, which includes the chamfered upper corners, has a trapezoidal shape in a direction parallel to the longitudinal axis 11. A lower portion 27 of the tapered sections 14, 15 of the waveguide core 12, which is not etched when the upper corners are chamfered, retains the original trapezoidal shape characterized by the pair of base angles $\theta 1$, $\theta 2$ (FIG. 2). The trapezoidal shape of the upper portion 25 may be characterized by a pair of base angles $\theta 3$, $\theta 4$ at the horizontal interface with the lower portion 27, which is indicated by a pair of dashed lines on FIG. 4. In an embodiment, the upper portion 25 may be an isosceles trapezoid characterized by base angles $\theta 3$, $\theta 4$ that are equal. In an embodiment, each of the base angles $\theta 3$, $\theta 4$ may be acute angles. In an alternative embodiment, the base angles $\theta 3$, $\theta 4$ may be unequal and different. The base angles $\theta 3$, $\theta 4$ of the upper portion 25 are smaller than the base angles $\theta 1$, $\theta 2$ of the lower portion 27.

The chamfering increases the angles of the sidewalls 24, 26 in the upper portion 25, relative to a vertical direction, in comparison with the angles of the sidewalls 24, 26 in the lower portion 27. The sidewalls 24, 26 in the upper portion 25 inwardly converge toward the top surface 28 such that the width of the upper portion 25 decreases with decreasing distance from the top surface 28.

The upper portion 25 of the tapered sections 14, 15 of the waveguide core 12 and the lower portion 27 of the tapered sections 14, 15 of the waveguide core 12 have different trapezoidal shapes. The tapered sections 14, 15 of the waveguide core 12 have a dual-trapezoidal shape, in a direction parallel to the longitudinal axis 11, resulting from the different trapezoidal shapes of the stacked upper portion 25 and lower portion 27. The upper portion 25 is stacked with the lower portion 27 in an arrangement in which the upper portion 25 is positioned (i.e., arranged) in a vertical direction over the lower portion 27. The lower portion 27 is positioned in a vertical direction between the upper portion 25 and the dielectric layer 20. The upper portion 25 is positioned in a vertical direction between the lower portion 27 and the top surface 28.

In an alternative embodiment, the upper portion 25 of the tapered sections 14, 15 of the waveguide core 12 may be formed by a thermal oxidation process that converts a portion of each upper corner to silicon dioxide such that the chamfering is provided. In an embodiment, a pad layer comprised of silicon nitride may be provided over the top surface 28 of the tapered sections 14, 15 of the waveguide core 12, and the dielectric layer 32 (FIG. 6) may be formed and recessed to expose the upper corners of the tapered sections 14, 15 of the waveguide core 12 beneath the pad layer. In an embodiment, the dielectric material that is formed by the thermal oxidation process merges with the dielectric material of the dielectric layer 32. For example, silicon dioxide formed by oxidizing the material of the waveguide core 12 may merge with silicon dioxide of the dielectric layer 32.

Figure 5:
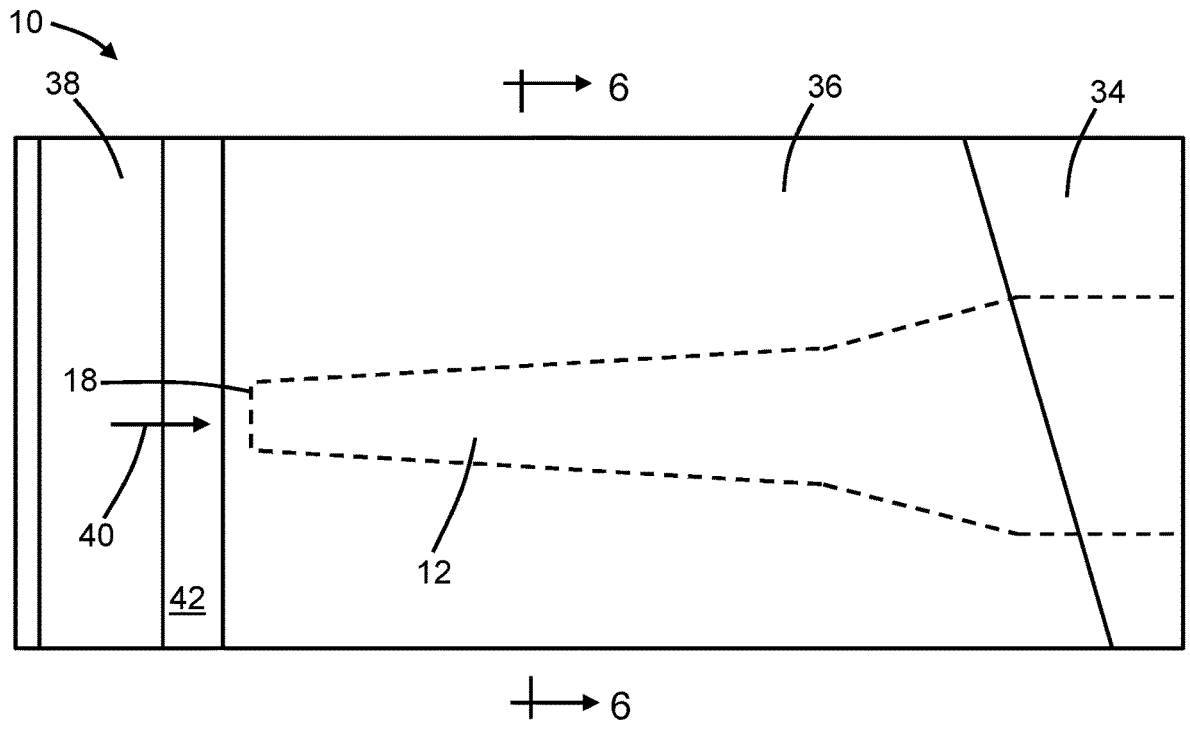
FIG. 5 is a top view of the structure at a fabrication stage of the processing method subsequent to FIG. 4.
Figure 6:
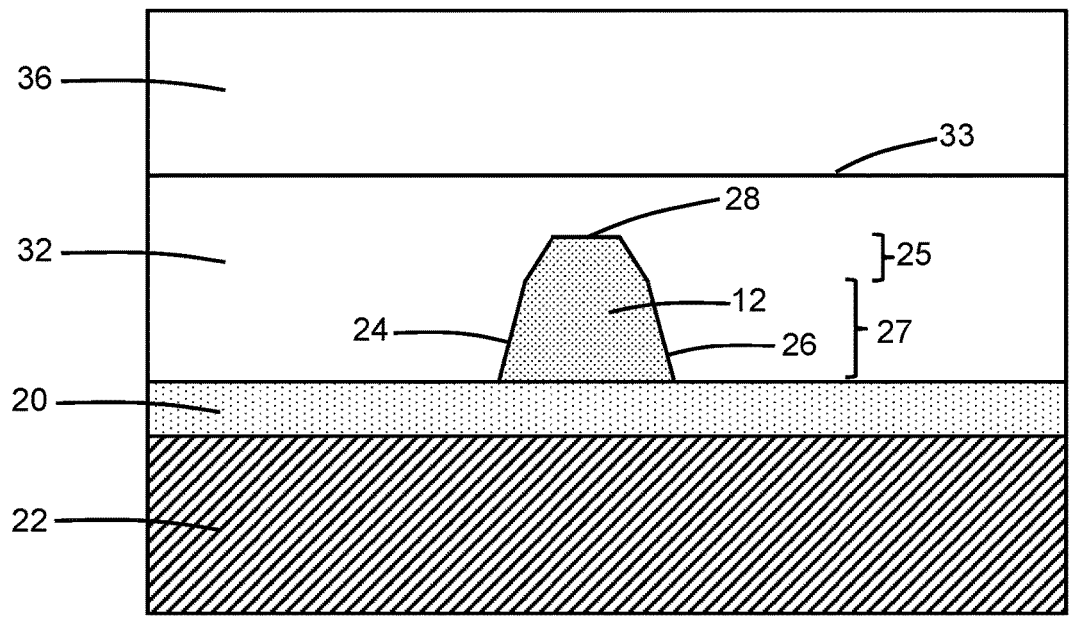
FIG. 6 is a cross-sectional view taken generally along line 6-6 in FIG. 5.

With reference to FIGS. 5, 6 in which like reference numerals refer to like features in FIG. 4 and at a subsequent fabrication stage, a dielectric layer 32 is deposited over the waveguide core 12 and planarized by chemical-mechanical polishing. The dielectric layer 32 may be comprised of a dielectric material, such as silicon dioxide. The dielectric material constituting the dielectric layer 32 may have a refractive index that is less than the refractive index of the material constituting the waveguide core 12. In an embodiment, the dielectric layer 32 may have a top surface 33 that is planar or substantially planar.

A back-end-of-line stack 34 may be formed over the dielectric layer 32. The back-end-of-line stack 34 may include stacked dielectric layers that are each comprised of a dielectric material, such as silicon dioxide, silicon nitride, tetraethylorthosilicate silicon dioxide, or fluorinated-tetraethylorthosilicate silicon dioxide. The back-end-of-line stack 34 may be removed from above the tapered sections 14, 15 of the waveguide core 12 and replaced by a dielectric layer 36 comprised of a homogeneous dielectric material, such as silicon dioxide. The back-end-of-line stack 34 and the dielectric layer 36 may adjoin along a diagonal interface. The tapered sections 14, 15 of the waveguide core 12 are embedded in the dielectric layer 32, which has a thickness greater than the thickness of the tapered sections 14, 15.

A light source 38 may provide light (e.g., emit laser light) in a mode propagation direction 40 toward an edge coupler including the waveguide core 12. The light may have a given wavelength, intensity, mode shape, and mode size, and the edge coupler may provide spot size conversion for the light. The space between the edge coupler and the light source 38 may be filled by air or by an index-matching material, such as an adhesive. The light source 38 may be positioned in a cavity 42 formed in the substrate 22. In an embodiment, the light source 38 may be a semiconductor laser diode positioned adjacent to the end 18 of the tapered section 14 of the waveguide core 12, and the semiconductor laser diode may be attached inside the cavity 42. In an alternative embodiment, the light source 38 may be a single-mode or multimode optical fiber that is positioned in the cavity 42 adjacent to the end 18 of the tapered section 14 of the waveguide core 12. In an alternative embodiment, the cavity 42 may extend as an undercut in the substrate 22 beneath the tapered section 14 of the waveguide core 12.

An edge coupler including the tapered sections 14, 15 of the waveguide core 12 may be positioned at an edge of a photonics chip for coupling light from either a semiconductor laser diode or an optical fiber. An edge coupler incorporating the tapered sections 14, 15 of the waveguide core 12 with the dual-trapezoidal shape may provide the ability to improve the mode match with, for example, a laser diode functioning as the light source 38. The tapered sections 14, 15 of the waveguide core 12 with the dual-trapezoidal shape may also be effective to reduce the optical coupling loss.

In alternative embodiments, a waveguide core including a section with the dual-trapezoidal shape may be deployed on the photonics chip in a context for incorporation into an optical component other than an edge coupler. In alternative embodiments, a waveguide core may include a curved section (i.e., a bend) with the dual-trapezoidal shape. In alternative embodiments, a waveguide core may include a non-tapered section with the dual-trapezoidal shape.

Figure 7:
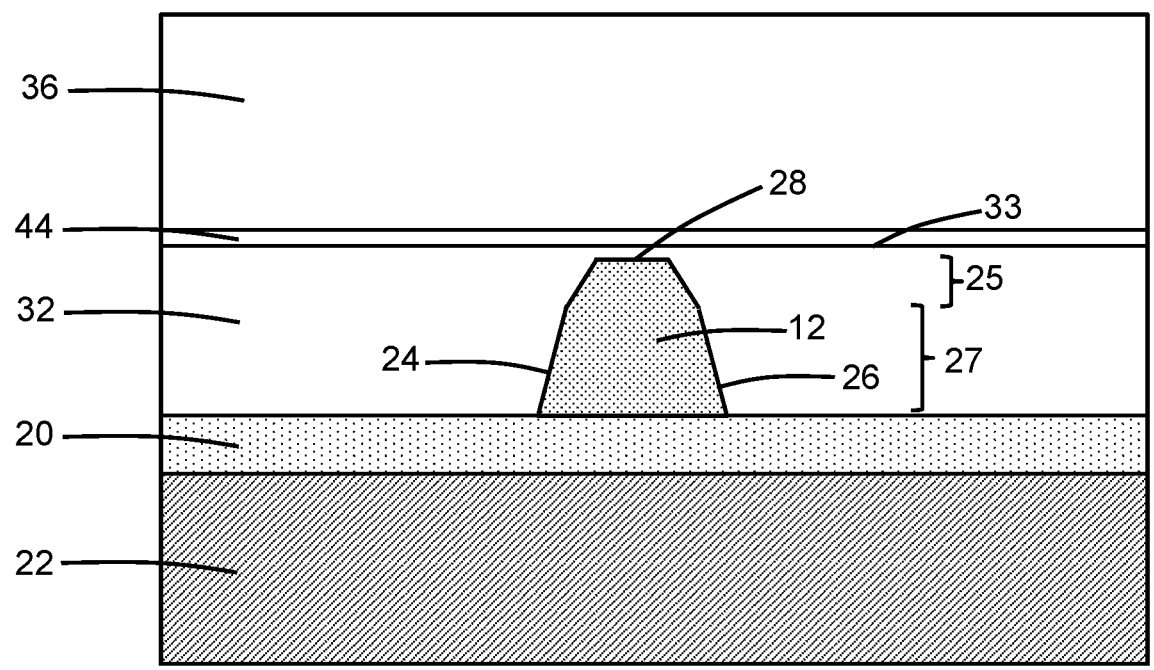
FIG. 7 is a cross-sectional view of a structure in accordance with alternative embodiments of the invention.

With reference to FIG. 7 and in accordance with alternative embodiments, a slab layer 44 may be formed over the top surface 33 of the dielectric layer 32 over at least the tapered sections 14, 15 of the waveguide core 12. The slab layer 44 may be comprised of a dielectric material, such as silicon nitride. In an embodiment in which the top surface 33 is planar, the slab layer 44 may be a planar layer that fully overlaps with the tapered sections 14, 15 of the waveguide core 12. In an embodiment, the slab layer 44 may extend into the back-end-of-line stack 34.

Figure 8:
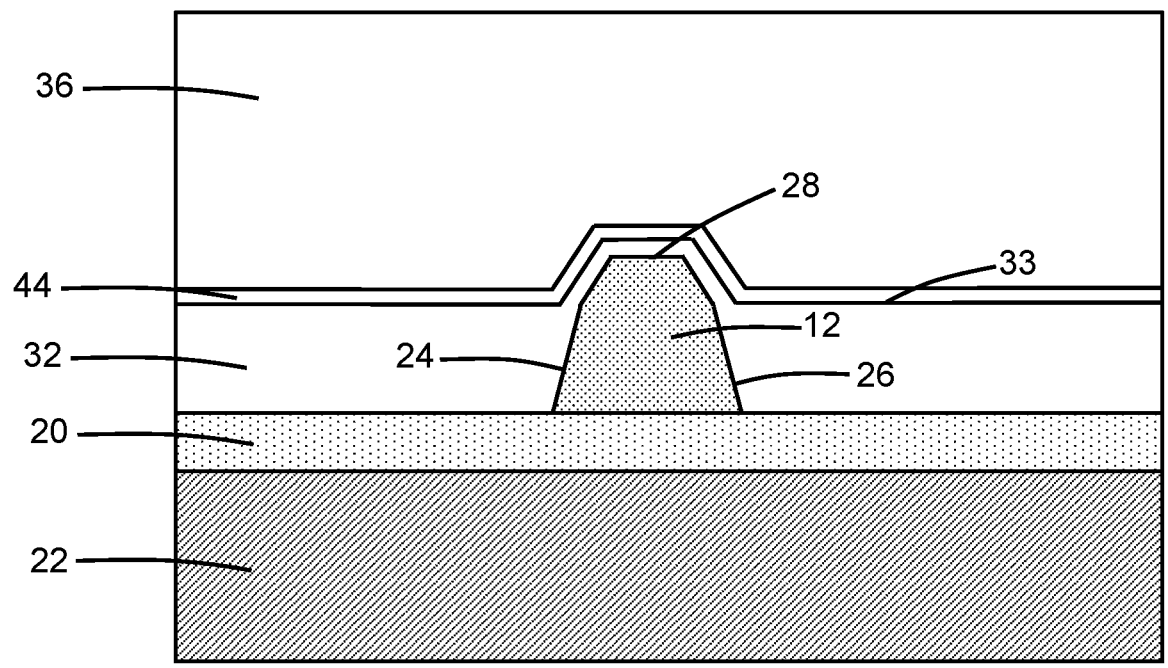
FIG. 8 is a cross-sectional view of a structure in accordance with alternative embodiments of the invention.

With reference to FIG. 8 and in accordance with alternative embodiments, the dielectric layer 32 may be pulled back with an etching process such that the top surface 33 of the dielectric layer 32 has a trapezoidal shape over the tapered sections 14, 15 of the waveguide core 12 resulting from the trapezoidal shape of the underlying tapered sections 14, 15 of the waveguide core 12. The slab layer 44 may be deposited with a conformal thickness such that the slab layer 44 has a section with a trapezoidal shape that follows the topography of the trapezoidal shape of the top surface 33 of the dielectric layer 32 above the tapered sections 14, 15 of the waveguide core 12. The extent of the pull back of the dielectric layer 32 may determine the rise (i.e., change in elevation) of the trapezoidal shape of the section of the slab layer 44 in a vertical direction over the tapered sections 14, 15 of the waveguide core 12. The addition of the trapezoidal section of the slab layer 44 may be effective to further reduce the optical coupling loss.

Figure 9:
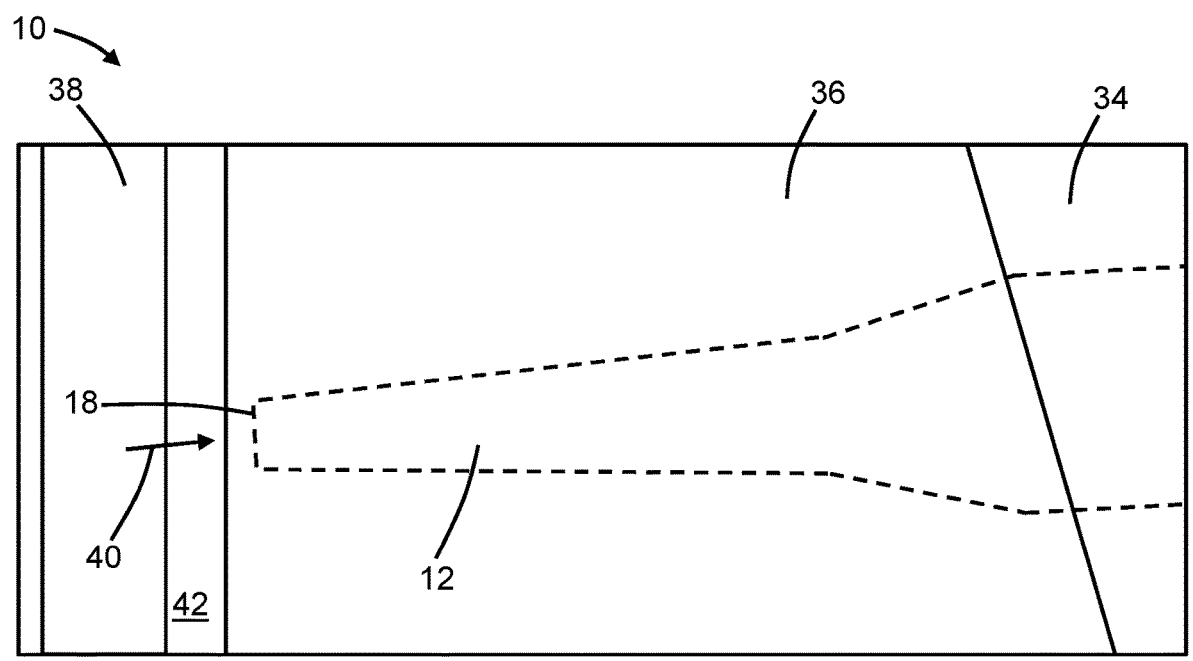
FIG. 9 is a top view of a structure in accordance with alternative embodiments of the invention.

With reference to FIG. 9 and in accordance with alternative embodiments, the sections 14, 15, 16 of the waveguide core 12 may be angled in a horizontal plane to compensate for angular misalignment of the mode propagation direction 40. For example, the light source 38 may be a semiconductor laser diode that includes a light-emitting laser stripe having an angular misalignment. The angling of the sections 14, 15, 16 of the waveguide core 12 may be effective to reduce back reflection to the light source 38.

Figure 10:
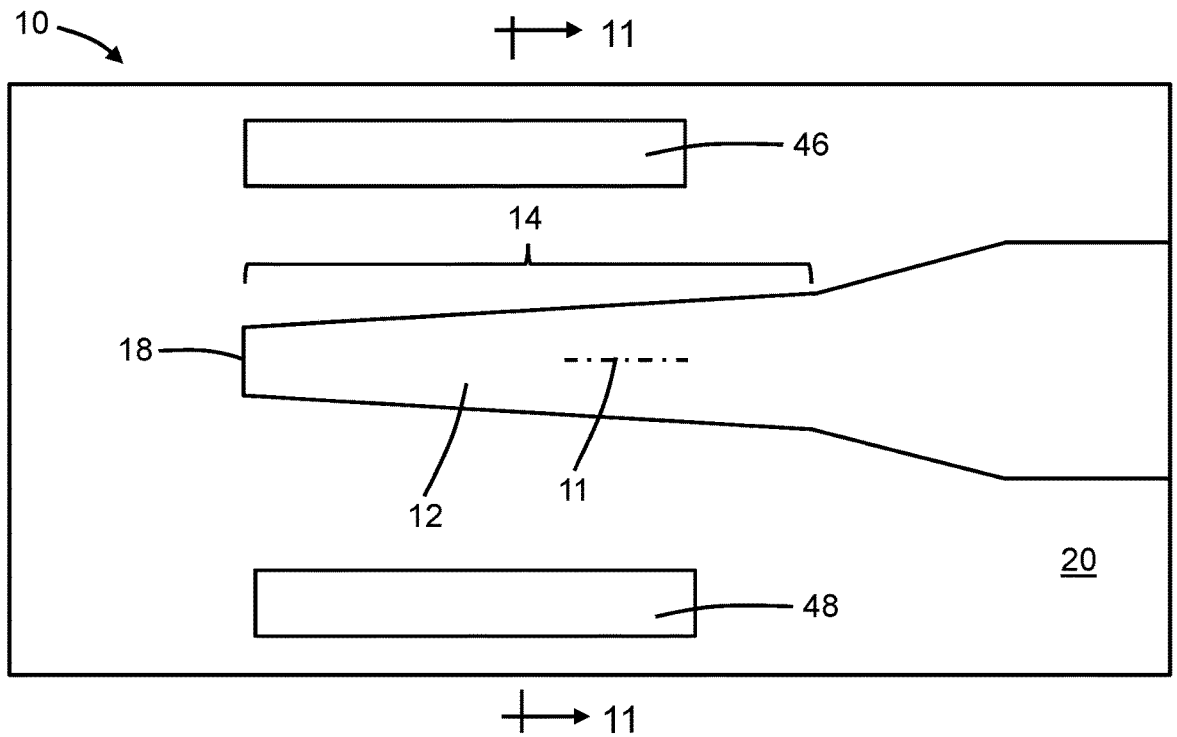
FIG. 10 is a top view of a structure in accordance with alternative embodiments of the invention.
Figure 11:
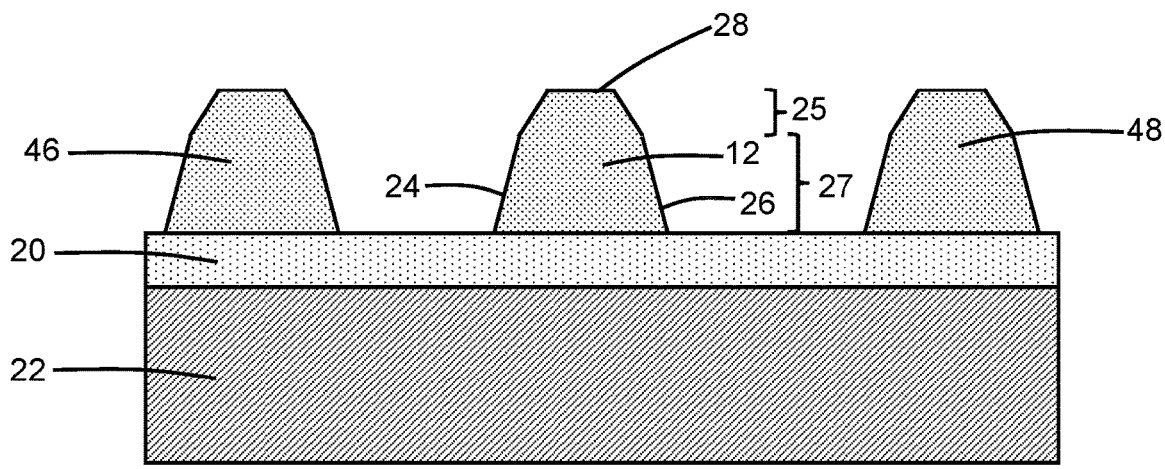
FIG. 11 is a cross-sectional view taken generally along line 11-11 in FIG. 10.

With reference to FIGS. 10, 11 and in accordance with alternative embodiments, additional waveguide cores 46, 48 may be formed on the dielectric layer 20. The waveguide core 46 may be positioned adjacent to the sidewall 24 of the tapered section 14 of the waveguide core 12, and the waveguide core 48 may be positioned adjacent to the sidewall 26 of the tapered section 14 of the waveguide core 12. Each of the waveguide cores 46, 48 may be formed with a stacked dual-trapezoidal shapes identical or similar to the stacked dual-trapezoidal shapes of the tapered section 14 of the waveguide core 12. In an embodiment, the trapezoidal shape of the upper portion 25 of the tapered section 14 and the trapezoidal shape of the respective upper portions of the waveguide cores 46, 48 may be identical or substantially identical. In an embodiment, the trapezoidal shape of the lower portion 27 of the tapered section 14 and the trapezoidal shape of the respective lower portions of the waveguide cores 46, 48 may be identical or substantially identical.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first waveguide core including a section having a first trapezoidal portion and a second trapezoidal portion stacked with the first trapezoidal portion, the first trapezoidal portion having a first trapezoidal shape, and the second trapezoidal portion having a second trapezoidal shape different from the first trapezoidal shape,
wherein the section of the first waveguide core is tapered, the section of the first waveguide core terminates at an end, and the first trapezoidal shape and the second trapezoidal shape extend to the end of the section of the first waveguide core.

2. The structure of claim 1 further comprising:
a light source positioned adjacent to the end of the section of the first waveguide core, the light source configured to provide light in a mode propagation direction to the section.

3. The structure of claim 2 wherein the light source is a semiconductor laser diode.

4. The structure of claim 3 wherein the section of the first waveguide core is rotated to compensate for angular misalignment of the mode propagation direction.

5. The structure of claim 1 wherein the section of the first waveguide core has a width that increases with increasing distance from the end.

6. The structure of claim 1 further comprising:
a second waveguide core adjacent to the section of the first waveguide core, the second waveguide core including a section having a first trapezoidal portion and a second trapezoidal portion stacked with the first trapezoidal portion, the first trapezoidal portion of the second waveguide core having a first trapezoidal shape, and the second trapezoidal portion of the second waveguide core having a second trapezoidal shape different from the first trapezoidal shape of the second waveguide core.

7. The structure of claim 1 wherein the first trapezoidal shape of the first trapezoidal portion has a first base angle, and the second trapezoidal shape of the second trapezoidal portion has a second base angle that is smaller than the first base angle.

8. The structure of claim 7 wherein the first base angle is a first acute angle, and the second base angle is a second acute angle.

9. The structure of claim 7 wherein the first waveguide core has a top surface, and the first trapezoidal portion is positioned adjacent to the top surface of the first waveguide core.

10. The structure of claim 1 wherein the first trapezoidal shape of the first trapezoidal portion has a first base angle and a second base angle, and the first base angle and the second base angle are equal.

11. The structure of claim 1 wherein the first trapezoidal shape of the first trapezoidal portion has a first base angle and a second base angle, and the first base angle and the second base angle are unequal.

12. The structure of claim 1 further comprising:
a semiconductor substrate; and
a dielectric layer on the semiconductor substrate,
wherein the first waveguide core is positioned on the dielectric layer, the first waveguide core has a top surface, and the second trapezoidal portion is positioned is positioned in a vertical direction between the first trapezoidal portion and the dielectric layer.

13. The structure of claim 1 further comprising:
a first dielectric layer over the section of the first waveguide core, the first dielectric layer having a planar top surface; and
a second dielectric layer on the planar top surface of the first dielectric layer, the second dielectric layer comprising silicon nitride,
wherein the second dielectric layer is planar.

14. The structure of claim 1 further comprising:
a first dielectric layer over the section of the first waveguide core, the first dielectric layer having a trapezoidal top surface; and
a second dielectric layer on the trapezoidal top surface of the first dielectric layer, the second dielectric layer comprising silicon nitride, and the second dielectric layer has a conformal thickness and a trapezoidal shape.

15. The structure of claim 1 wherein the end of the section of the first waveguide core is configured to be positioned adjacent to a light source.

16. The structure of claim 15 wherein the light source is configured to provide light in a mode propagation direction to the section of the first waveguide core.

17. A method comprising:
forming a waveguide core including a section having a first trapezoidal portion and a second trapezoidal portion stacked with the first trapezoidal portion,
wherein the first trapezoidal portion has a first trapezoidal shape, the second trapezoidal portion has a second trapezoidal shape, the second trapezoidal shape is different from the first trapezoidal shape, the section of the waveguide core is tapered, the section of the waveguide core terminates at an end, and the first trapezoidal shape and the second trapezoidal shape extend to the end of the section of the waveguide core.

18. The method of claim 17 wherein forming the waveguide core including the section having the first trapezoidal portion and the second trapezoidal portion stacked with the first trapezoidal portion comprises:
oxidizing upper corners of the section of the waveguide core to form the first trapezoidal portion.

19. The method of claim 17 wherein forming the waveguide core including the section having the first trapezoidal portion and the second trapezoidal portion stacked with the first trapezoidal portion comprises:
etching upper corners of the section of the waveguide core with an isotropic etching process to form the first trapezoidal portion.

20. The method of claim 17 wherein the section of the waveguide core has a width that increases with increasing distance from the end, and further comprising:
forming a cavity adjacent to the end of the section of the waveguide core,
wherein the cavity is configured to receive a light source.

\* \* \* \* \*